C. R. KRONE.
INDICATOR FOR VEHICLES.
APPLICATION FILED JULY 19, 1915.
1,222,000.
Patented Apr. 10, 1917.
2 SHEETS—SHEET 2.
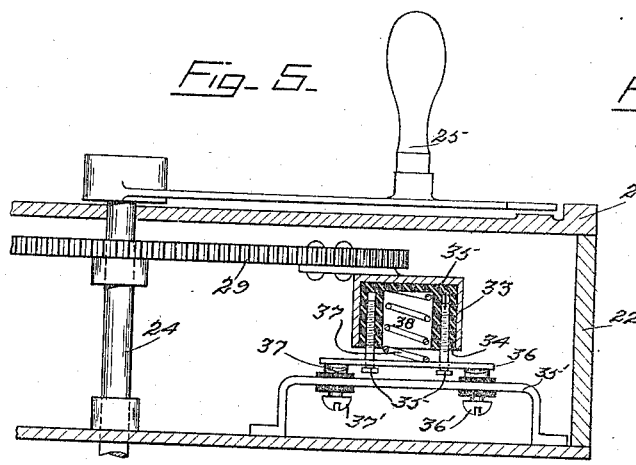
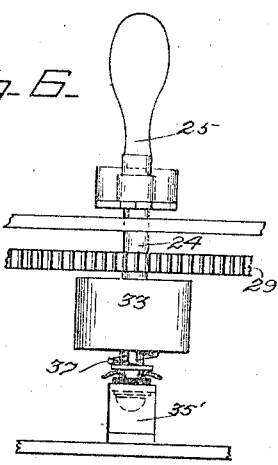
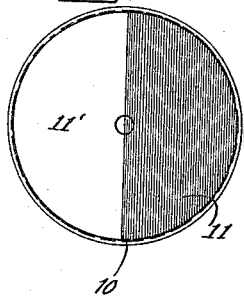
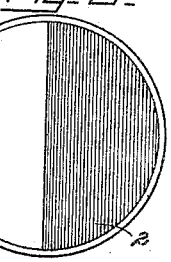
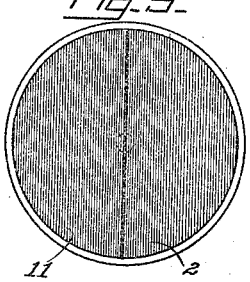
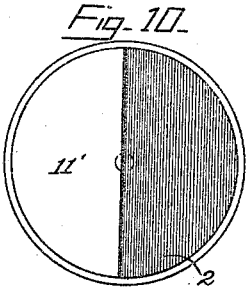
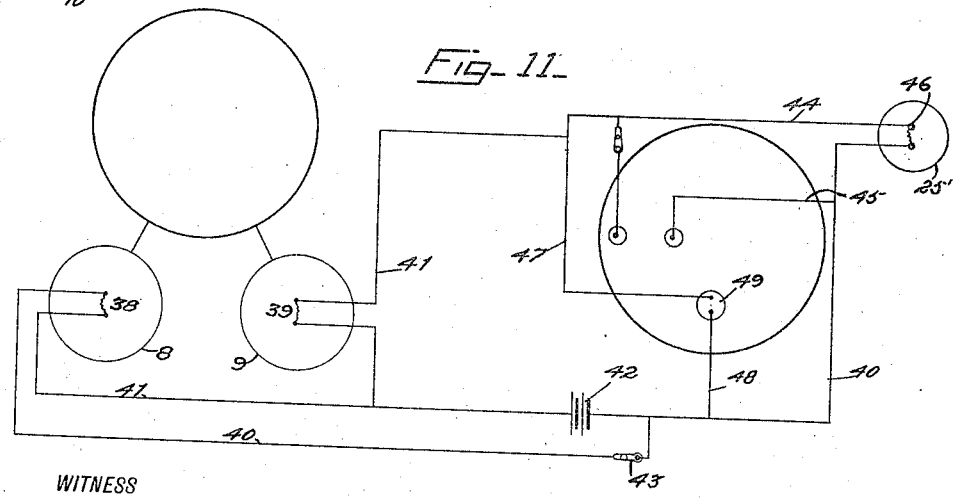
WITNESS
Wm. F. Drew.
INVENTOR
Carl R. Krone
BY
Acheson & Totten
ATTORNEYS

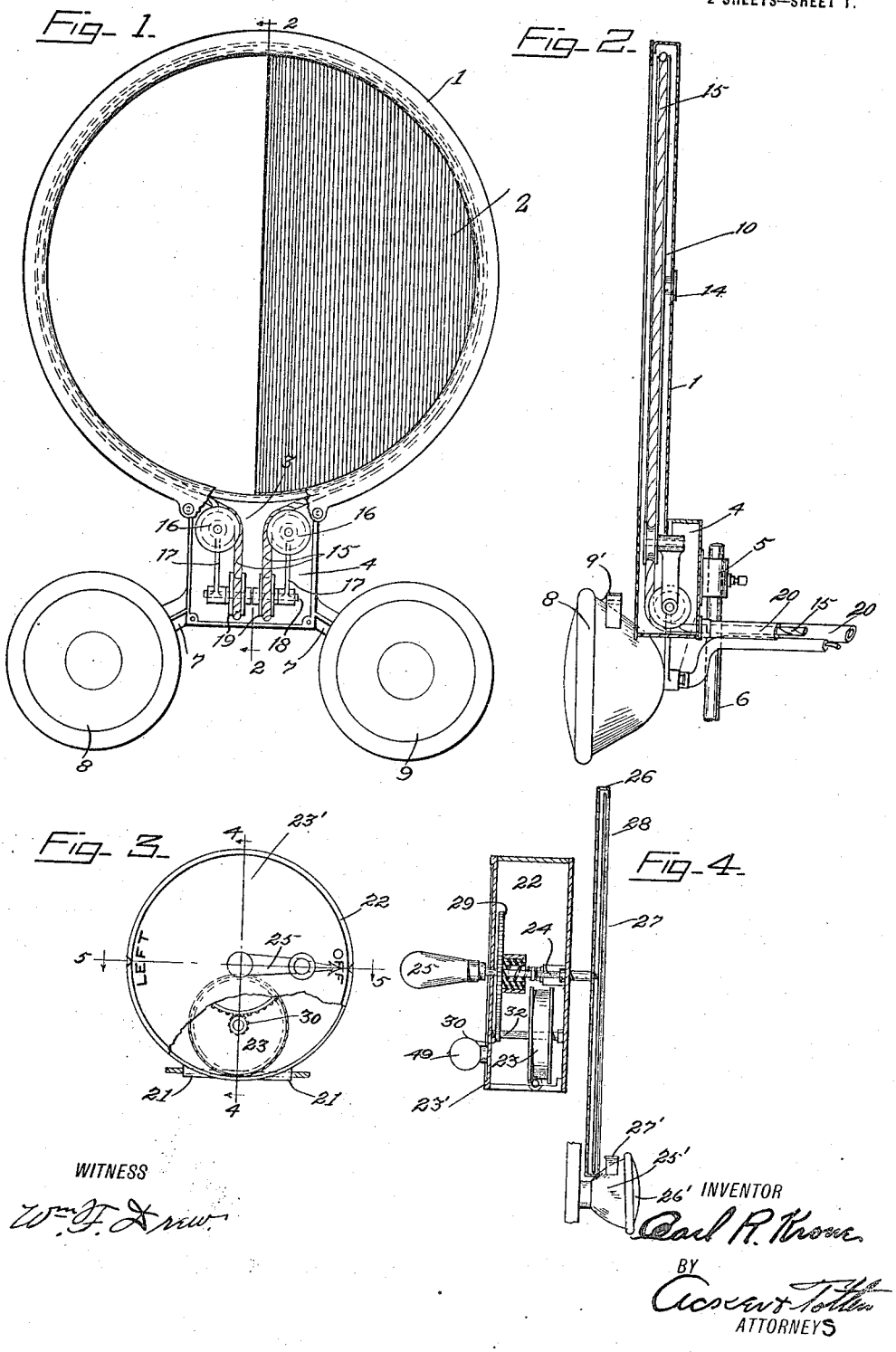

UNITED STATES PATENT OFFICE.

CARL R. KRONE, OF OAKLAND, CALIFORNIA.

INDICATOR FOR VEHICLES.

1,222,000.     Specification of Letters Patent.     Patented Apr. 10, 1917.

Application filed July 19, 1915. Serial No. 40,649.

*To all whom it may concern:*

Be it known that I, CARL R. KRONE, a citizen of the United States, residing at Oakland, in the county of Alameda and State of California, have invented certain new and useful Improvements in Indicators for Vehicles, of which the following is a specification.

The present invention relates to improvements in signals for vehicles and the like, to denote the course to be taken by the vehicle operator, and the invention has for its principal objects to provide a signal system of targets and lamps adapted to be operated by the vehicle operator to apprise those in advance of the vehicle, such as the crossing or traffic policeman, and those in rear of the vehicle, such as following vehicles, the course to be taken by the vehicle displaying the signal; to provide a device which is capable of use in day as well as at night, and one which is simple in construction, may be manufactured at little cost, and is thoroughly efficient for the purpose intended.

Vehicle traffic being regulated in this country to pass to the right of vehicles going in an opposite direction, it is thought only necessary to provide an apparatus which will denote the movement or turning of the vehicle to the left, and the present application is designed for that purpose; however should it be desired to indicate the movement or turning of the vehicle to the right, the apparatus may be duplicated, and for this purpose with targets of different colors than those for signaling a turning to the left.

With the above mentioned and other objects in view, the invention consists in the novel construction and combination of parts hereinafter described; illustrated in the accompanying drawings and set forth in the claim hereto appended; it being understood that various changes in the form, proportion, size and minor details of construction within the scope of the claim may be resorted to without departing from the spirit or sacrificing any of the advantages of the invention.

To more fully comprehend the invention, reference is directed to the accompanying drawings, wherein—

Figure 1 is a view in front elevation of an embodiment of my invention, disclosing the disks or targets in their normal position, the flexible connections for operating the movable target and the tail lamp and danger signal lamp.

Fig. 2 is a sectional view taken on line 2—2 of Fig. 1, disclosing the flexible operating connection for the movable disk or target.

Fig. 3 is a view in plan partly broken away of the operating or controlling means positioned within convenient reach of the operator.

Fig. 4 is a sectional view taken on line 4—4 of Fig. 3, disclosing the targets to indicate to those in advance of the vehicle, the intended direction of travel of the vehicle.

Fig. 5 is an enlarged sectional view of the controlling box disclosing more fully the mechanism for completing the lamp circuits on the operation to a certain position of the controlling handle.

Fig. 6 is a side view in detail of the switch contact mechanism.

Fig. 7 is a view in detail of one of the movable targets or disks removed from the housing.

Fig. 8 is a view in detail of the superimposed target or disk carried by the face of the housing.

Fig. 9 is a view of the targets when the same are in a position to denote danger or the turning to the left of the vehicle.

Fig. 10 is a view in detail of the targets as when in their normal position.

Fig. 11 is a view of the wiring diagram.

Referring more particularly to the several views of the drawings, wherein like characters of reference designate corresponding parts throughout the several views, 1 is a circular casing provided at its front with a semicircular closed portion 2 which is preferably colored red, and the center line of which extends diametrically through the center of the front of the casing. The casing communicates at its lower edge through a passage 3 with an enlarged portion 4 which carries a supporting bracket 5 removably mounted on a support 6 carried in rear of the vehicle. A pair of arms 7 depend from the enlarged portion 4 and the same carry at their ends the respective lamps 8 and 9, the lamp 8 being what is commonly termed the tail lamp, and the lamp 9 being one which is lighted when the movable disk is operated to indicating position. The lamps 8 and 9 are each provided in the upper portion of their body with an aperture 9' through which light is directed onto the face of the casing to illuminate the disks or targets. Rotatably positioned on the casing 1, on a supporting shaft 14, is a suitable target or disk 10, one-half of its area colored red, as at 11, and the color extending from one edge to the center thereof, as in Fig. 7, and the other half being preferably white, as at 11'. A peripheral groove is provided in the disk 10 and in the same is seated a flexible operating connection 15 which passes over the idlers 16 in the enlarged portion 4 and which are carried by brackets 17 supported on a shaft 18 and which idlers maintain the connection taut about the disk. The connection 15 passes over rollers 19 mounted on the shaft 18 between the brackets 17, and extend from the enlarged portion 4 through tubes 20 to a point adjacent to the vehicle driver's seat, where they pass through openings 21 into a suitable casing 22 and are wound in opposite directions about a drum 23 rotatably mounted in the casing.

The casing 22 is preferably circular in shape and has a removable cover 23' providing a dial, and centrally through said casing extends a rotatable shaft 24 carrying at one end an operating handle 25 which operates over the dial and forms an indicating hand.

The shaft 24 projects into a casing 26 which is circular in form and which is mounted on the front of the vehicle, and said casing like that in the rear has a semicircular disk or target 27 covering one vertical half of the front thereof and the same is preferably colored red.

Within the casing 26 is positioned a disk or target 28 which is mounted on the end of the shaft 24 and one half of said disk is preferably red in color, and the other white, and the red portion normally lies beneath the red disk or target 27 of the casing. A signal lamp 25' having a red glass 26' and an outlet opening 27', through which the light rays pass to reflect on the disks, is positioned adjacent to the casing 26.

A geared operating wheel 29 is positioned within the casing 22 and is carried by the shaft 24, and the same intermeshes with a pinion 30 carried by a shaft 32 which mounts the drum 23. The operating wheel 29 carries a socket member 33 provided interiorly with the insulating material 34 and in which is threaded the headed screws 35 which support a yieldable contact finger 36 which is normally forced downwardly by the spring 37 seated in a recess 38 in the material 34.

A bracket or support 35' is mounted in the casing 22 at a point beneath the operating handle when the same has been rotated to a position to present an entire red surface to both the front and rear casings, and the same mounts the terminals 36 and 37, which connect with suitable globes 38 and 39 in the respective lamps 8 and 9 through the wires 40 and 41. A battery 42 provides power for the circuit and a switch 43 is adapted to be operated when it is desired to extinguish the globe 38 in the tail lamp 8. Leads 44 and 45 branch from the wires 40 and 41 and connect with a globe 46 in the lamp 25', and leads 47 and 48 branch from the wires 40 and 41 and connect with a globe 49 on the cover 23 of the casing 22.

The vehicle operator, when it is desired to turn the vehicle to the left, operates the handle 25 for a one-half turn in a counter-clockwise direction, which movement causes the disks 10 and 28 to each rotate one-half of a revolution so that the red surfaces thereof and of the casing will be in the position as in Fig. 9. The rotation of the handle will make a contact between the wires 40 and 41 which will cause the globes 39 and 25' to be lighted. The returning of the handle 25 to its normal position returns the disks or targets to the position as in Fig. 8, and breaks the contact between the terminals 36' and 37' and extinguishes the lamps 39 and 25'.

The signal device may be attached to the vehicle in any suitable manner just so long as one signal device displays at the front and the other at the rear of the vehicle, and the controlling or operating station is positioned within convenient reach of the vehicle operator.

The formation of the front of the casing 26 being a duplicate of casing 1, and the disk 28 therein being a duplicate of the disk or target 10, the operation thereof may be readily understood by reference to Figs. 7, 8, 9 and 10.

Having thus described my invention what I claim is:—

A signaling device for vehicles comprising a relatively narrow casing having a metallic semicircular colored face portion and a circular signal member disposed behind said face plate for rotary movement, means for supporting said signal comprising a forwardly projecting part engaging the center thereof and secured to the rear portion of the casing, the said signal member having one half of its area colored to correspond with the color of the semicircular face portion, the other half thereof when exposed producing with the colored face plate a contrasting whole, and means for moving the signal member upon its support whereby the same forms with the colored face portion a solidly colored figure, for the purpose described.

In testimony whereof I have signed my name to this specification in the presence of two subscribing witnesses.

CARL R. KRONE.

Witnesses:
HARRY A. TOTTEN,
D. B. RICHARDS.

Copies of this patent may be obtained for five cents each, by addressing the "Commissioner of Patents, Washington, D. C."